(12) United States Patent
Oyama

(10) Patent No.: US 7,843,639 B2
(45) Date of Patent: Nov. 30, 2010

(54) LIGHT DISTRIBUTION CONTROL METHOD, LIGHT DISTRIBUTION CONTROL DEVICE, AND GREENHOUSE USING THE SAME

(75) Inventor: Nobuo Oyama, Tokyo (JP)

(73) Assignee: Kabushiki Kaisha S.T.I. Japan, Tokyo (JP)

( * ) Notice: Subject to any disclaimer, the term of this patent is extended or adjusted under 35 U.S.C. 154(b) by 739 days.

(21) Appl. No.: 11/714,253

(22) Filed: Mar. 6, 2007

(65) Prior Publication Data

US 2008/0219010 A1 Sep. 11, 2008

(51) Int. Cl.
*G02B 27/00* (2006.01)
*A01G 9/22* (2006.01)

(52) U.S. Cl. .......................... 359/591; 47/17
(58) Field of Classification Search ......... 359/591–598; 404/22–24; 47/17
See application file for complete search history.

(56) References Cited

U.S. PATENT DOCUMENTS

| | | | | | |
|---|---|---|---|---|---|
| 286,137 | A | * | 10/1883 | Hyatt | 359/596 |
| 2,518,044 | A | * | 8/1950 | Mattison | 359/596 |
| 4,634,222 | A | * | 1/1987 | Critten | 359/596 |
| 5,802,784 | A | * | 9/1998 | Federmann | 52/204.5 |
| 6,239,910 | B1 | * | 5/2001 | Digert | 359/596 |
| 6,542,303 | B1 | * | 4/2003 | Oyama | 359/591 |
| 2004/0177582 | A1 | * | 9/2004 | Adriaansen | 52/537 |
| 2006/0288645 | A1 | * | 12/2006 | Konstantino et al. | 49/92.1 |

FOREIGN PATENT DOCUMENTS

| | | | |
|---|---|---|---|
| JP | 1-239347 | | 9/1989 |
| JP | 07296617 A | * | 11/1995 |
| JP | 09282916 A | * | 10/1997 |
| JP | 11-287993 | | 10/1999 |
| JP | 2000017760 A | * | 1/2000 |
| JP | 2000173324 A | * | 6/2000 |
| JP | 2002-81275 | | 3/2002 |
| JP | 2006073366 A | * | 3/2006 |
| WO | WO 9714982 A1 | * | 4/1997 |

* cited by examiner

*Primary Examiner*—Christopher E Mahoney
*Assistant Examiner*—Leon W Rhodes
(74) *Attorney, Agent, or Firm*—Wenderoth, Lind & Ponack, L.L.P.

(57) ABSTRACT

A plurality of structures each having a number of ridges and being formed in a long and thin plate shape or a long and thin film shape. The cross section of each of the ridges forms a portion of a substantial circle and a surface thereof is a practically specular surface. The ridges of each structure are parallel to each other and respective adjacent surfaces thereof correspond to each other in parallel and are spaced apart from each other at a predetermined distance. When light is incident on a point of a surface of one of the structures at an incident angle, in either its reflection or transmittance, the light is diffused in a circular conical plane whose vertex is the incident point and whose center axis is a line parallel to the ridges, by a diffraction effect caused by the arrayed ridges. The flux of reflected diffused light is spread in one lengthwise half of the circular conical plane and the flux of transmitted diffused light is spread in the other lengthwise half of the circular conical plane.

11 Claims, 10 Drawing Sheets

LIGHT DISTRIBUTION CONTROL METHOD, LIGHT DISTRIBUTION CONTROL DEVICE, AND GREENHOUSE USING THE SAME

BACKGROUND OF THE INVENTION

1. Field of the Invention

The present invention relates to a passive daylighting technology or a technology for controlling a flux of an artificial light source without using a driving means.

2. Description of the Related Art

A venetian blind disclosed in JP 2002-081275A by the applicant of the present invention provides a structure wherein each of transparent slats is divided into two portions, i.e. an outdoor side and an indoor side. Also, a number of ridges, each of which has substantially circular cross section, are arrayed sufficiently/substantially close to each other in a direction perpendicular to the longitudinal axis of the slat on the upper surface of the outdoor side of the slat. The sunlight reflected on this surface is diffused substantially symmetrically by the ridges with respect to an axis parallel to a longitudinal direction of each of the ridges, then strikes the lower surface of the indoor side of the slat just above, and is transmitted being diffused by the ridges given in the manner similar to the above in the longitudinal direction of the slat substantially symmetrically with respect to an axis parallel to the longitudinal direction of the slat. The sunlight is thereby diffused widely into a room.

JP 2002-081275A also discloses a light distribution control device for bringing in light to a shaded area or part by using diffused light passing through a surface of a plate or film structure in which the same ridges are arrayed, or for reducing glare by uniformly diffusing a flux of a lamp.

However, the array of the ridges required for such a blind and light distribution control device demands a high level of manufacturing technology, so that it is not easy to stably realize the shape and the function satisfied on a stable basis. Therefore, the symmetry of diffused rays with respect to a light incident at a large azimuth angle is not sufficient. In a case of the use of such diffused light passing through the surface of the structure, a large portion of the light is lost due to the reflection on the surface of the structure. This results in leaving room for improvement of energy use efficiency.

SUMMARY OF THE INVENTION

The present invention has been made to solve the above-mentioned problems, and an object of the present invention is to provide a light distribution control method and device/equipment capable of efficiently utilizing diffused light with ideas in design and use of such structure, without demanding improvement of the manufacturing technology close to which is almost hitting the limit of the current technology level.

Another object of the present invention is to provide a greenhouse using such a light distribution control device/equipment.

The light distribution control method of the present invention employs a plate or film like structure which is at least either transparent or reflective, and has a number of ridges arrayed parallel and sufficiently/substantially close to each other on at least one of the faces of the structure. Each of the ridges has a substantially circular cross section orthogonal to the longitudinal direction of the ridge, so that the light incident to the practically specular surfaces of such a number of ridges are diffused in a conical plane or half conical plane which has a center axis with a line passing through the incident point and parallel to the ridges.

The "practically specular surface" can be defined as follows.

It has been known that, when the size of a rugged spot/an unevenness of a predetermined surface of a structure is sufficiently smaller than a wavelength of light, the light incident on the surface has specular reflection, while, the size of the rugged spot/such an unevenness is equal to or larger than the wavelength of the light, such light has irregular/scattered reflection (diffused reflection). A surface which causes specular reflection is generally called a "specular surface"

When most of the subject surface is a "specular surface", or comprises portions of "specular surfaces" distributed substantially uniformly, and the ratio of the aggregated area of the specular surface portions to the area of the predetermined portion of the surface (referred to as "Specular Ratio") is considered within an appropriate range in view of the use of the subject surface, the subject surface is defined as a "practically specular surface". For example, in view of the function demanded, a mirror is required to have specular reflection with most of incident light, and thus the Specular Ratio may be about equal to or larger than 0.9.

The light distribution control device in respect to the present invention comprises a plurality of structures, each of which is formed in a plate-like shape and a film-like shape with at least one of optical transparency and optical reflectivity, and includes a number of ridges which are arrayed in parallel on at least one of the surfaces of the structure and are placed sufficiently/substantially close to each other. Each of the ridges has its cross section orthogonal to the longitudinal direction of the ridges, formed in a portion of a substantial circle, and the surface is practically specular. The structures are arrayed such that the ridges are parallel to each other and the corresponding surfaces of the adjacent two of the structures are in parallel and apart from each other at a predetermined distance, wherein light diffused in one of a circular conical plane-like and a semi-circular conical plane having the center axis being a line parallel to the ridges is transmitted in a direction for light distribution when light is incident on the ridges of each of the structures.

It is preferable to have the plurality of ridges formed on each of the surfaces of the structures.

Further, each of the structures may have one of a long and thin plate structure or a long and thin film structure, or a number of ridges may be formed along the direction crossing the longitudinal direction of each of the structures. In this case, each of the structures may have a bent shape or a V-shape in its cross section orthogonal to the longitudinal direction thereof.

The light distribution control device preferably further includes an adjusting mechanism for varying the angle of the structure relative to the arraying direction of the plurality of structures.

The light distribution control device of the present invention may be installed at a window, through which outside light enters and the plurality of structures may be arrayed along a surface of the window to redirect light diffused by the ridges of each of the structures into a room, at a place which gets light from outside and is located above a shaded area by a building to redirect the outside light diffused by the ridges of each of the structures into the area which would be shaded by the building or in a greenhouse at least either on the ceiling portion, on the wall portion or in the vicinity of either one of those to bring in diffused light by the ridges of each of the structures to the interior space of the greenhouse.

The greenhouse in respect to the present invention is provided by having the above mentioned light distribution control device at least either on the ceiling or the wall or in the vicinity of either one of those.

Further, at least either the ceiling portion or the wall portion can be made with light distribution panels each of which comprises the light distribution control device held between double structured transparent plates.

DETAILED DESCRIPTION OF THE PREFERRED EMBODIMENTS

The following describes embodiments of the present invention, referring to the attached drawings.

The inventor of this application made prototypes of light diffusion structures having ridges by using optical fibers and round bars with various diameters, and examined each respective distribution of light diffusion. As a result, it was discovered that in the case of a number of ridges being arrayed in parallel and sufficiently/substantially close to each other, the curved edge of the cross section of each ridge being an arc, and the surface of each ridge being substantially specular, then a pencil light "A" incident at a point "i" on the surface of the structure is diffused along a circular-conical plane which has its vertex at the point "i" by diffraction-effect caused with the array of the ridges in either its reflection or its transmittance. The reflected diffusion light goes along a half-circular-conical plane, while the transmitted diffusion light goes along the rest of the half-circular-conical plane.

Figure 1:
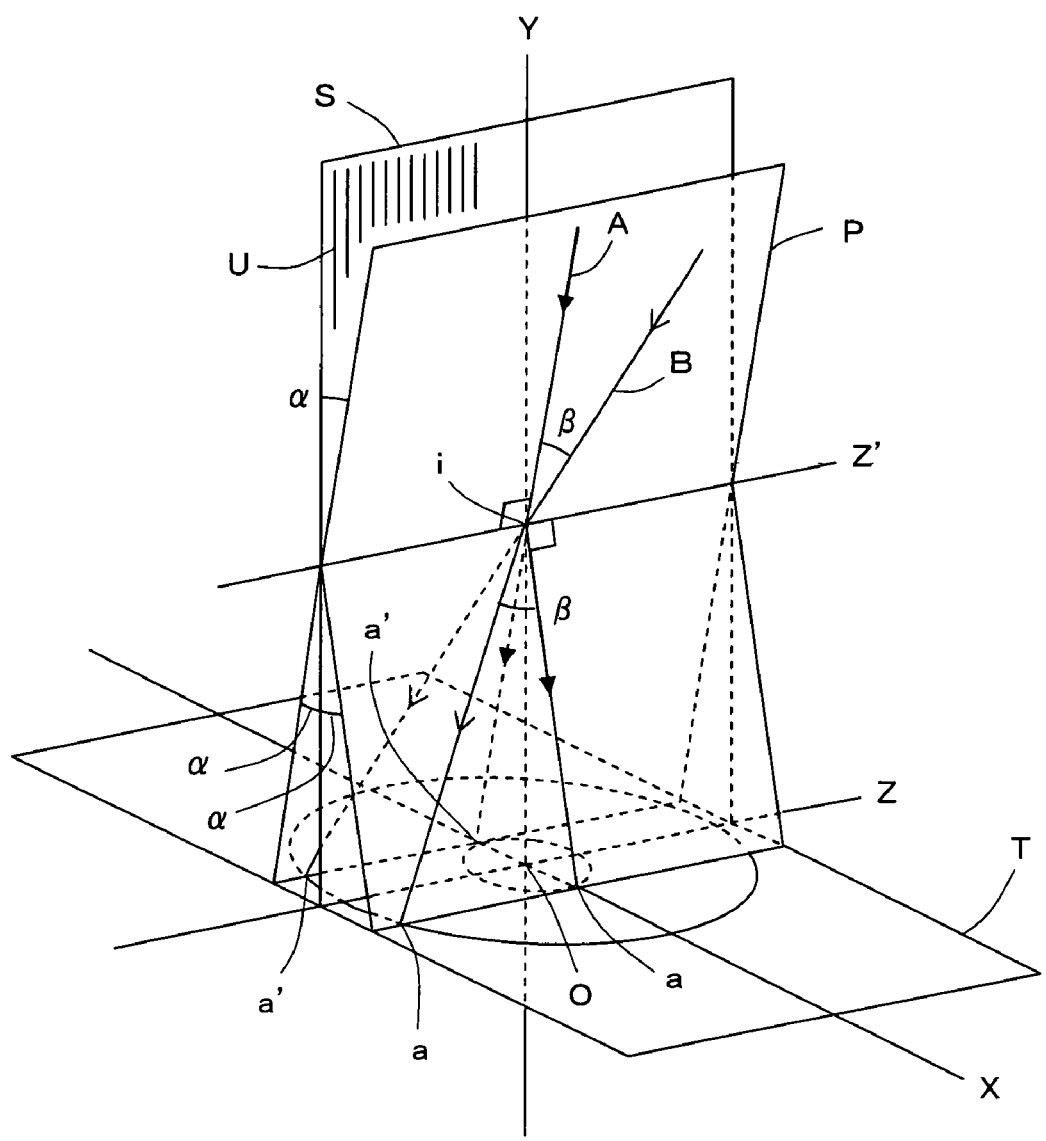
FIG. 1 is an explanatory view showing a light distribution control method according to the present invention.

Such diffusion along a circular-conical plane has the following characteristics in addition to the above. As shown in FIG. 1, an orthogonal coordinate system is assumed in which a line which passes through the point "i" and is parallel to a longitudinal direction of ridges "U" is set as Y-axis, then X-axis and Z-axis orthogonal to Y-axis are added.

In this orthogonal coordinate system, when the thickness of the planar structure is neglected, a YZ-plane corresponds to the structure. The YZ-plane is set as a plane S. An XZ-plane orthogonal to the Y-axis at a coordinate origin O located below the point "i" is set as a plane T. An axis which passes through the point "i" and is parallel to the Z-axis is set as a Z'-axis. A plane including the Z'-axis and crossing the plane S at an acute angle "α" is set as a plane P.

When the plane S is assumed to be specular and a pencil light "A" travels on the plane P and is incident to the plane S at the point "i", the intersection point of the plane T and the reflected pencil light of the pencil light "A" and the intersection point of the plane T and the transmitted pencil light of the pencil light "A" are referred to as "a" and "a'", respectively. A half of a circle having the line segment "Oa" joining the point "a" and the origin point "O" as its radius becomes the cross section of the reflected diffused light of the pencil light "A" on the plane T. A half of a circle having the line segment "Oa'" joining the point "a'" and the origin "O" as its radius becomes the cross section of the diffused light of the pencil light "A" on the plane T. As in the case of light "B" incident on the plane S of the structure, when an acute angle β at which the light passing through the incident point "i" crosses an XY plane, which is parallel to the ridges U and perpendicular to the plane S, becomes larger, the spread of the diffused flux increases.

The luminance in a direction in such diffused flux shows the maximum value in the direction of reflected rays or transmitted rays with the plane "S" wherein plane "S" is assumed as a flat specular surface. The luminance decreases linearly as (the direction of a diffused ray is) setting far from the direction with which the maximum value is shown, corresponding the angle with the direction showing such maximum value. Uniformity of the luminance distribution on the direction of (diffused rays in) the diffused flux (herein after referred to as "luminance distribution of diffused flux") can be improved by selecting a circumferential angle or radian, the maximum diameter of an orthogonal cross section of each of such ridges and the proximity between the adjacent ridges.

An example of the selection will be described. A ridge radius is set to 1 mm, 0.5 mm, and 0.125 mm and the circumferential angle of the ridge cross section and an interval between the adjacent ridges are changed. Then, the allowance of performance of a light distribution control device in fields to which the present invention is applied as described below is evaluated by an engineer H1, a market developer H2, and an expected salesperson H3, that is, three persons in total. A result obtained by the evaluation shows the following Table 1.

Note that the evaluation is performed based on three levels, "1: applicable", "2: split over application in some intended uses", and "3: difficult to apply".

TABLE 1

| Ridge Radius | Circumferential Angle | Ridge Interval | H1 | H2 | H3 |
|---|---|---|---|---|---|
| 1 mm | 160° | approximately 5 μm | 2 | 2 | 2 |
|  |  | approximately 10 μm | 2 | 3 | 2 |
|  |  | approximately 100 μm | 3 | 3 | 3 |
|  | 140° | approximately 5 μm | 3 | 2 | 3 |
|  |  | approximately 10 μm | 2 | 3 | 3 |
|  |  | approximately 100 μm | 3 | 3 | 3 |
| 0.5 mm | 160° | approximately 5 μm | 1 | 1 | 2 |
|  |  | approximately 10 μm | 1 | 2 | 2 |
|  |  | approximately 100 μm | 3 | 3 | 2 |
|  | 140° | approximately 5 μm | 1 | 2 | 2 |
|  |  | approximately 10 μm | 2 | 2 | 2 |
|  |  | approximately 100 μm | 3 | 3 | 3 |
| 0.125 mm | 160° | approximately 5 μm | 1 | 1 | 1 |
|  |  | approximately 10 μm | 1 | 2 | 1 |
|  |  | approximately 100 μm | 3 | 3 | 3 |

Embodiment 1

Figure 2:
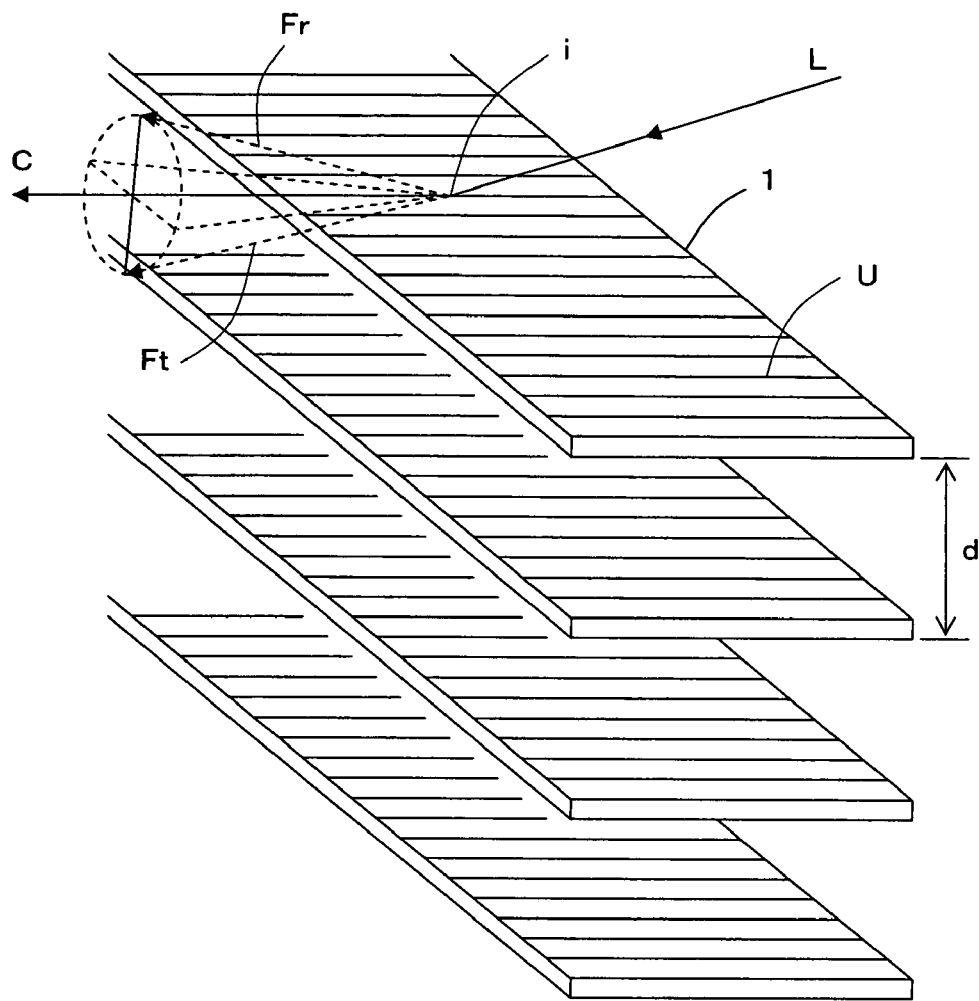
FIG. 2 is a partial perspective view showing a light distribution control device according to a first embodiment of the present invention.

A light distribution control device according to Embodiment 1 is shown in FIG. 2. The light distribution control device comprises a plurality of structures 1, each of which has a number of ridges U as described above and is formed in a long and thin plate shape or a long and thin film shape. In each of the structures 1, the ridges U are formed so as to cross a longitudinal direction of each of the structures 1, more specifically, to be orthogonal thereto. The structures 1 are arrayed such that the corresponding faces of the adjacent structures 1 are parallel to each other and apart from each other at a predetermined distance as well as the ridges U of the adjacent structures 1 are parallel to each other. In FIG. 2, the ridges U are schematically expressed by simple line segments in order to indicate the direction of formation thereof. In fact, the ridges U, each of which has the cross section forming a portion of a substantial circle and the surface being practically specular, are arrayed sufficiently/substantially close to each other on the surface of each structure 1.

Figure 3A:
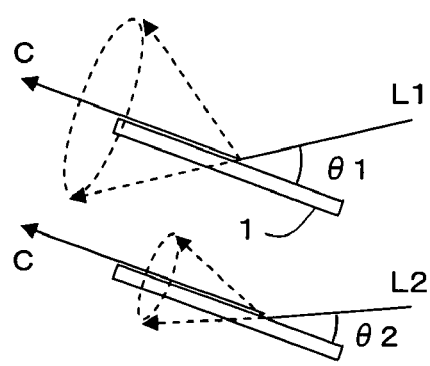
FIGS. 3A and 3B are cross sectional views showing an operation of the light distribution control device according to the first embodiment of the present invention, respectively.

Each structure 1 has both optical transparency and optical reflectivity. As shown in FIG. 2, when light L is incident at the point "i" on the surface of the structure 1 at an incident angle, in either its reflection or its transmittance, the light L is diffused along a circular conical plane which has the vertex with the point "i" and the center axis C with a line parallel to the ridges U by a diffraction effect caused by the arrayed ridges U. The reflected diffused flux of light Fr is spread in a lengthwise half of the circular conical plane and the transmitted diffused flux of light Ft is spread in the remaining lengthwise half of the circular conical plane. The center axis C of the diffused flux of light is directed constantly in parallel to the ridges U without depending on the incident angle of the light L. For example, as shown in FIG. 3A, incident light L1 on the surface of the structure 1 at an incident angle θ1 and incident light L2 thereon at an incident angle θ2 are diffused in the respective circular conical plane having center axes C in the same direction.

The light distribution control device is located such that the ridges U of each of the structures 1 are aligned in the desired direction for light distribution. Therefore, light incident to the surface of the each structure 1 is diffused along a circular conical plane which has the center axis C in the direction parallel to the ridges U, i.e. in the desired direction for distribution of light, either in its reflection or transmittance. Thus, light can be efficiently diffused in a desirable direction to perform light distribution.

When each of the structures 1 has at least optical transparency, the ridges U may be formed on either one of the principal surfaces, opposing each other, of the structure 1. For example, in the case of the structures 1 shown in FIG. 2, the ridges U are formed on an upper surface of each of the structures. However, the ridges U can be formed on a lower surface of the structures 1. When the ridges U are formed on both of the opposed principal surfaces, the diffusion effect is further improved.

When each of the structures 1 has only optical transparency with no optical reflectivity, only the transmitted diffused flux Ft is spread in a lower lengthwise half of the circular conical plane in FIG. 2. However, a light distribution in the desirable direction can be made similarly.

Figure 3B:
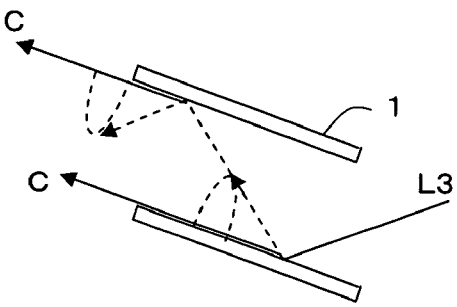
Figure 4A:
FIGS. 4A to 4H are cross sectional views showing various patterns of a structure used for the light distribution control device, respectively.
Figure 4B:
Figure 4C:
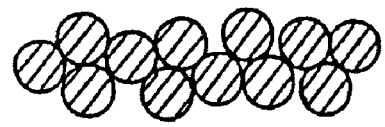
Figure 4D:
Figure 4E:
Figure 4F:
Figure 4G:
Figure 4H:
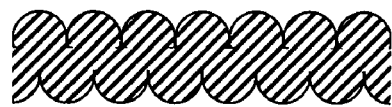

In contrast, when each of the structures 1 has only optical reflectivity with no optical transparency, only the reflected diffused flux Fr is spread in an upper lengthwise half of the circular conical plane in FIG. 2. However, a light distribution in the desirable direction is made similarly. When each structure 1 has only optical reflectivity, it is sufficient to form the ridges U only on the surface irradiated with incident light, which is one of the principal surfaces being opposite to each other in each structure 1. However, when the ridges U are formed on both of the principal surfaces, as in the case of incident light L3 shown in FIG. 3B, the reflected diffused flux given by the ridges U on the upper surface of a lower structure 1 is diffused by the ridges U on the lower surface of a structure 1 located just above the lower structure 1. Thus, more effective diffused light distribution is realized.

Ridges having various cross sections as shown in, for example, FIGS. 4A to 4H can be used as the ridges U. It is necessary to employ the ridges U, each of whose cross section forms a portion of a substantial circle and whose surface is a practically specular surface. The diameter of each of the ridges U is preferably smaller than 3 mm and equal to or larger than 50 μm.

Figure 5:
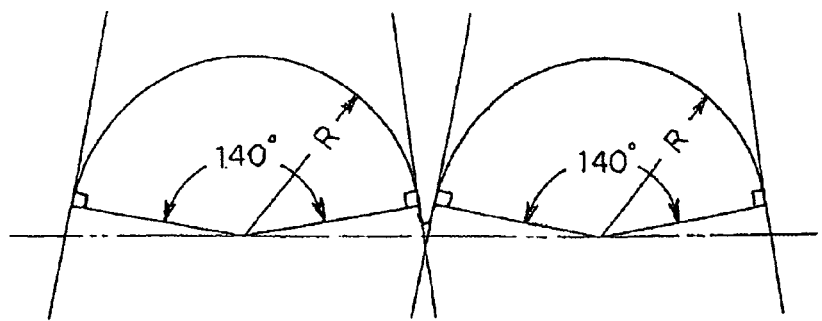
FIG. 5 is an enlarged cross sectional view showing ridges of the structure.

When the structure 1 is to be formed having the ridges U connected with each other on the adjacent arc portions as shown in FIGS. 4A, 4E, 4G and 4H, the commercial production of such structure can be realized by an extrusion process by having the circumferential angle of the arc portion of each ridge to be equal to or larger than 140 degrees, and adding a straight line portion in the tangent line direction at each end of the arc portion extended to a depth substantially equal to the radius of each ridge U, being measured from the apex of the ridge U, so that the ridge contacts the adjacent ridge at this point, as shown in FIG. 5.

Embodiment 2

Figure 6:
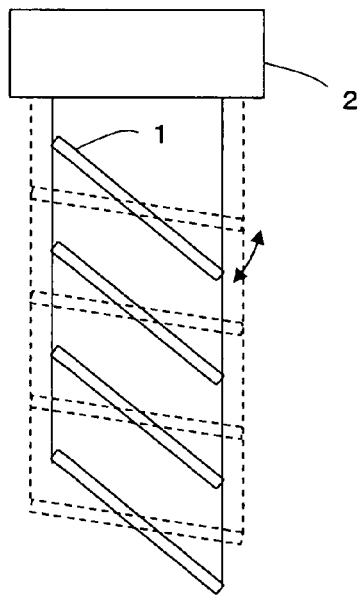
FIG. 6 is a side view showing a light distribution control device according to a second embodiment of the present invention.

FIG. 6 shows a light distribution control device according to Embodiment 2. This light distribution control device has almost the same structure as the light distribution control device according to Embodiment 1 but further includes an adjusting mechanism 2 for adjusting an angle of the plurality of structures 1 which are parallel to one another. A mechanism for adjusting a tilt of a plurality of blades of a general-purpose blind can be used as the adjusting mechanism 2.

Since the adjusting mechanism 2 is provided, the angle of the respective structures 1 can be easily adjusted corresponding to the desired direction for light distribution.

Embodiment 3

Figure 7:
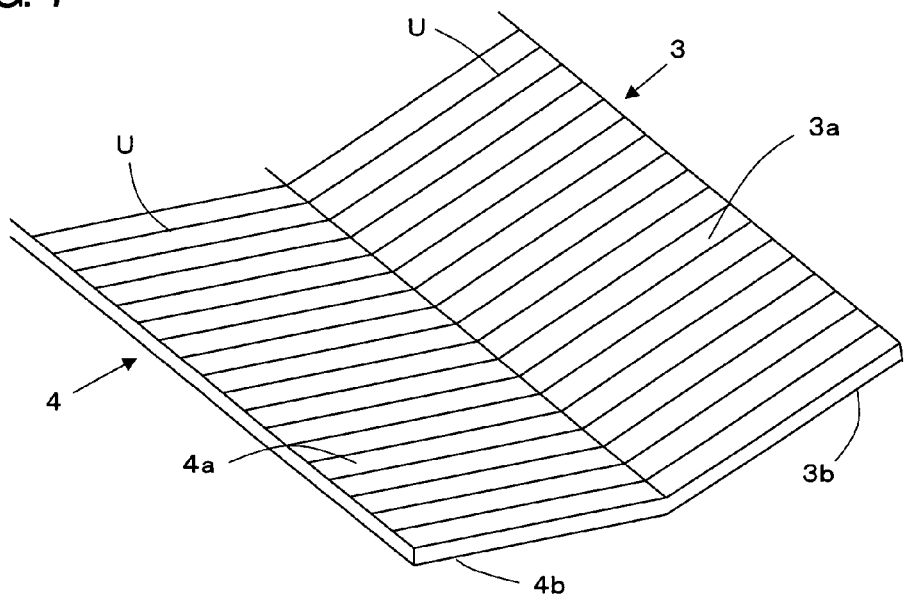
FIG. 7 is a partial perspective view showing a structure used for a light distribution control device according to a third embodiment of the present invention.

While each of the structures 1 used in the light distribution control device according to Embodiment 1 has a plate shape, it is possible to use a structure 1 whose cross section that is orthogonal to a longitudinal direction thereof has a bent shape or a V-shape as shown in FIG. 7. That is, the structure 1 comprises an outside portion 3 and an inside portion 4 which are divided along the longitudinal direction, wherein the ridges U are formed on each of the surface 3a of the outside portion 3 and the surface 4a of the inside portion 4 in a direction orthogonal to the longitudinal direction. The structure 1 has both optical transparency and optical reflectivity.

Figure 8:
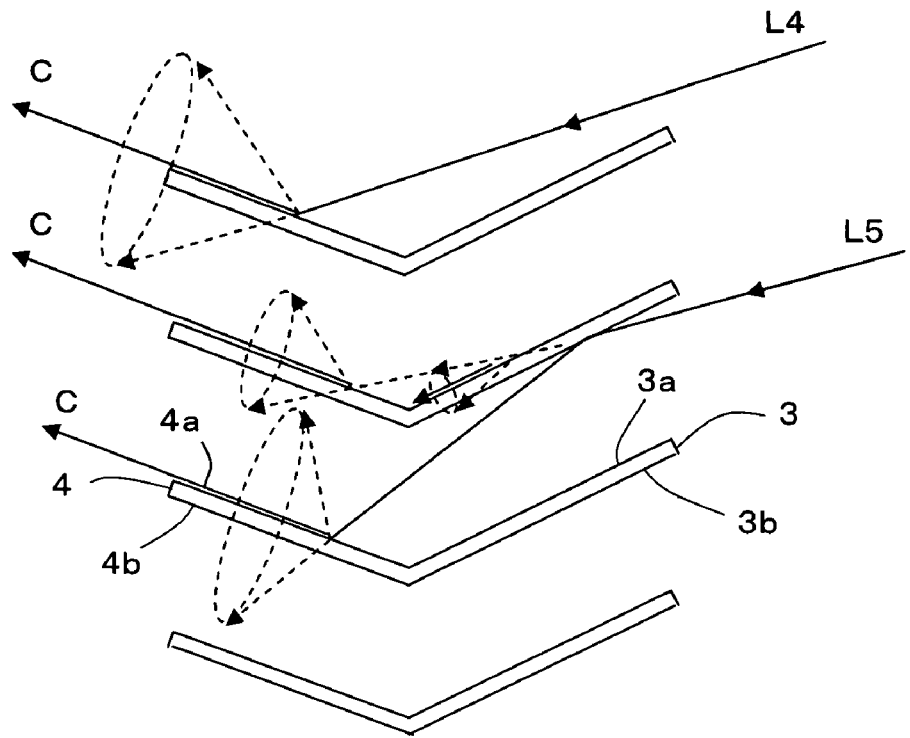
FIGS. 8 and 9 are side views each showing the light distribution control device according to the third embodiment of the present invention, respectively.

As shown in FIG. 8, a plurality of structures 1, each of whose cross section has a bent shape, are arrayed in parallel and apart from each other at a predetermined distance to construct the light distribution control device according to Embodiment 3.

For example, the light distribution control device is placed such that the outside portion 3 is located on a side from which light from a light source, such as sunlight or artificial light comes, and the ridges U of the inside portion 4 are aligned in the direction for light distribution. As in the case of incident light L4, the light directly incident on the surface 4a of the inside portion 4 is diffused in a circular conical plane whose center axis C is a line parallel to the ridges U by a diffraction effect given by the arrayed ridges U, in either its reflection or its transmittance. Because the structure 1 has the cross section with the bent shape, when light is incident on the rear surface 3b of the outside portion 3 (of the structure), as in the case of incident light L5, the light reflected on the rear surface 3b of the outside portion 3 becomes incident on the surface 4a of the inside portion 4 of the structure 1 located just under the first mentioned structure 1 and is diffused in a circular conical plane whose center axis C is a line parallel to the ridges U. In the flux of the incident light L5, light transmitting the outside portion 3 is diffused by the ridges U of the surface 3a of the outside portion 3. Then, in the flux of such diffused light, light incident on the surface 4a of the inside portion 4 is diffused in a circular conical plane having the center axis C, by the ridges U of the surface 4a. The final direction of diffusion of this light distribution control device is determined by the alignment direction of the ridges U of the inside portion 4, so this becomes the direction for light distribution. Thus, light can be more efficiently redirected/collected from a light source, and diffused in the direction for light distribution by employing the structures 1 each of which has a cross section of a bent shape.

The ridges U may be formed, not on each of the surface 3a of the outside portion 3 and the surface 4a of the inside portion 4 of the structure 1, but on each of the rear surfaces 3b and 4b thereof. The ridges U can be formed on a surface in one of the outside portion 3 and the inside portion 4 and on a rear surface in the other of the outside portion 3 and the inside portion 4.

Figure 9:
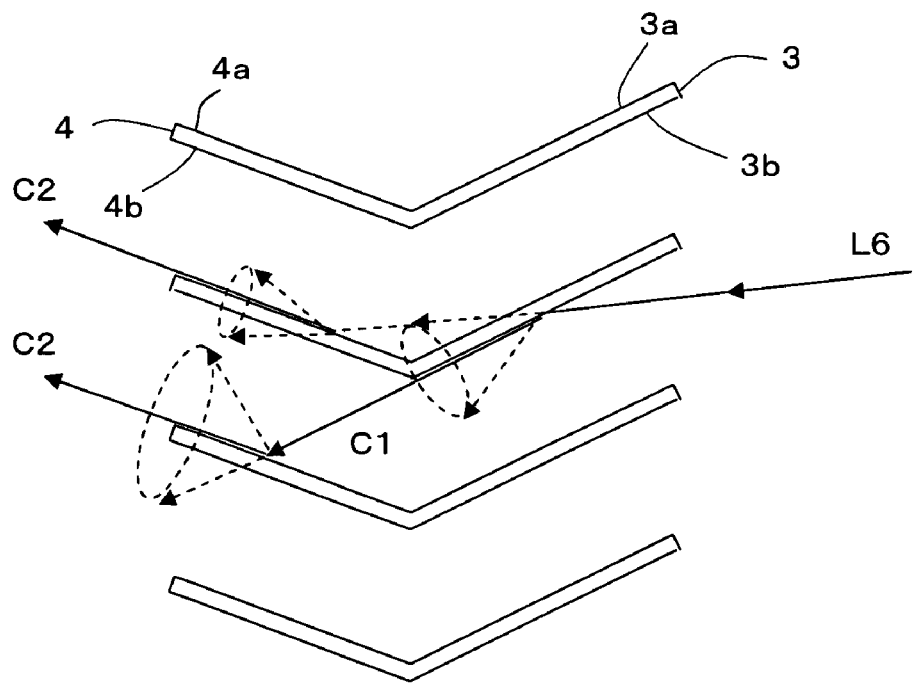

Further, the ridges U are preferably formed on each of the surface 3a and the rear surface 3b of the outside portion 3 and each of the surface 4a and the rear surface 4b of the inside portion 4 in a direction orthogonal to the longitudinal direction. Therefore, as shown in FIG. 9, for example, as in the case of incident light L6, light incident on the rear surface 3b of the outside portion 3 of a first structure 1 is diffused in a circular conical plane whose center axis C is a line parallel to the ridges U of the rear surface 3b of the outside portion 3. Then, the reflected flux of diffused light is incident on the surface 4a of the inside portion 4 of a second structure 1 located just under the first structure 1 and is further diffused in a circular conical plane whose center axis C2 is a line parallel to the ridges U of the surface 4a of the inside portion 4. The transmitted flux of a diffused transmission diffused light, given by the diffusion on the rear surface 3b of the outside portion 3, is incident on the surface 4a of the inside portion 4 of the first structure 1 and is further diffused in a circular conical plane whose center axis C2 is a line parallel to the ridges U of the surface 4a thereof.

Each of the structures 1 may be a structure having only one of optical transparency and optical reflectivity.

The light distribution control device according to Embodiment 3 preferably includes and provides the adjusting mechanism 2 which is described in Embodiment 2 to easily vary the angle of the respective structures 1.

Embodiment 4

Figure 10:
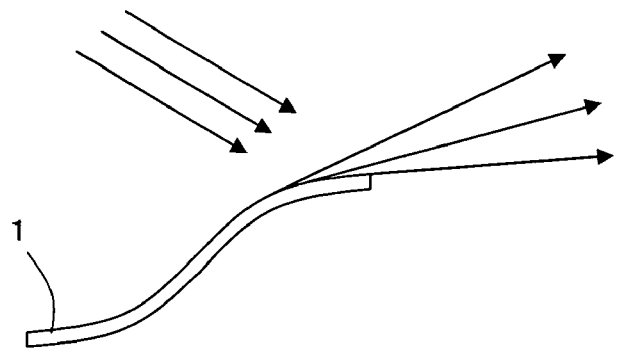
FIG. 10 is a cross sectional view showing a structure used for a light distribution control device according to a fourth embodiment of the present invention.

As shown in FIG. 10, it is possible to use a structure 1 whose cross section orthogonal to a longitudinal direction thereof has a curved shape. A plurality of such structures 1 can be arrayed in parallel to one another at predetermined intervals. The ridges U are formed on a curved surface in a direction orthogonal to the longitudinal direction. Because the structure 1 is curved, incident light is diffused in a conical plane whose center axis is a line extending in a direction tangential to the curve at an incident point. Therefore, the light is diffused in a circular conical plane having the center axis not in one direction but in an extended angle range, so that more uniform light distribution can be made in a wide range.

Figure 11:
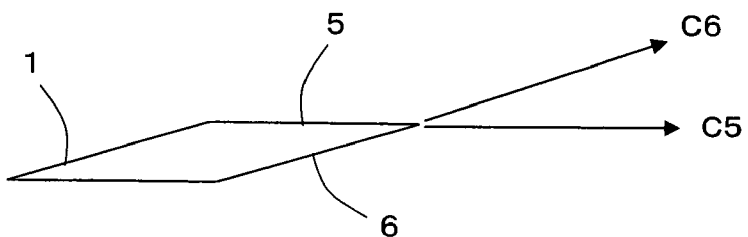
FIG. 11 is a cross sectional view showing a structure used for a modified example of the light distribution control device according to the fourth embodiment of the present invention.

As shown in FIG. 11, it is also possible to use a structure 1 whose cross section orthogonal to a longitudinal direction having a rhombic or rectangular shape. A plurality of such structures 1 can be arrayed in parallel to one another and apart from each other at a predetermined distance. The ridges U are formed on the surfaces 5 and 6 of the structure 1 in a direction orthogonal to the longitudinal direction. In this case, because the ridges U are arrayed on two surfaces 5 and 6 directed to the direction for light distribution, light incident on the surface 5 is diffused in a circular conical plane whose center axis C5 is a line parallel to the ridges U of the surface 5, and light incident on the surface 6 is diffused in a circular conical plane whose center axis C6 is a line parallel to the ridges U of the surface 6. Therefore, circular conical diffusion is caused in two directions, resulting in possibly having more uniform light distribution.

Each of the structure 1 shown in FIG. 10 and the structure 1 shown in FIG. 11 may be a structure having both optical transparency and optical reflectivity or a structure having only one of optical transparency or optical reflectivity.

Embodiment 5

Figure 12:
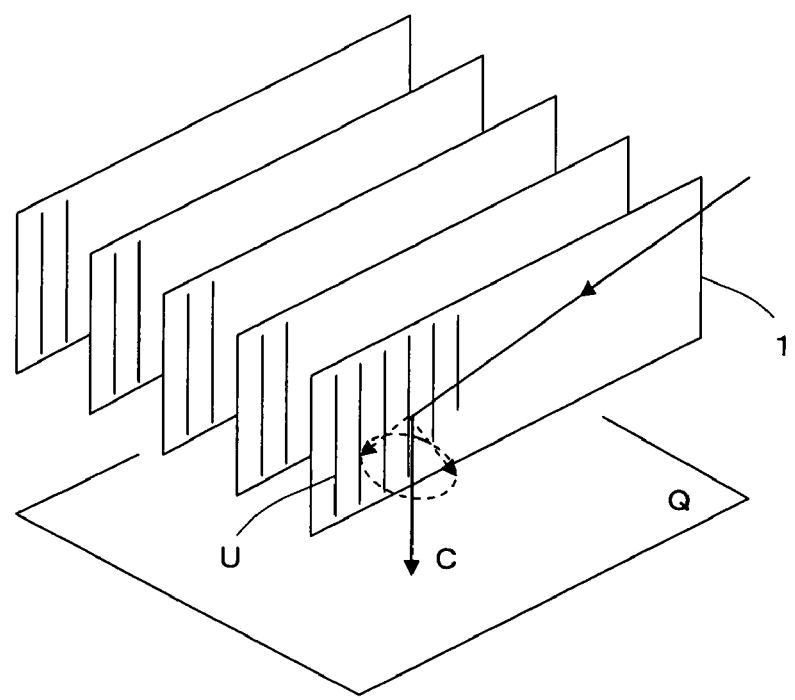
FIG. 12 is a perspective view showing a light distribution control device according to a fifth embodiment of the present invention.

FIG. 12 shows a light distribution control device according to Embodiment 5. In this light distribution control device, a plurality of structures 1, which are described in for example Embodiment 1, are arranged in parallel to one another and apart from each other at a predetermined distance in a horizontal direction above a region Q which is subjected to light distribution such that the surfaces of the structures 1 are directed vertically. The ridges U of each of the structures 1 are aligned in the vertical direction.

When sunlight or the like is incident on the surface of each of the structures 1, arrayed as described above, from an oblique upward direction, the sunlight is diffused in a circular conical plane whose center axis C is a vertical downward line parallel to the ridges U. As a result, uniform light distribution is made on the region Q located under the light distribution control device.

Figure 13:
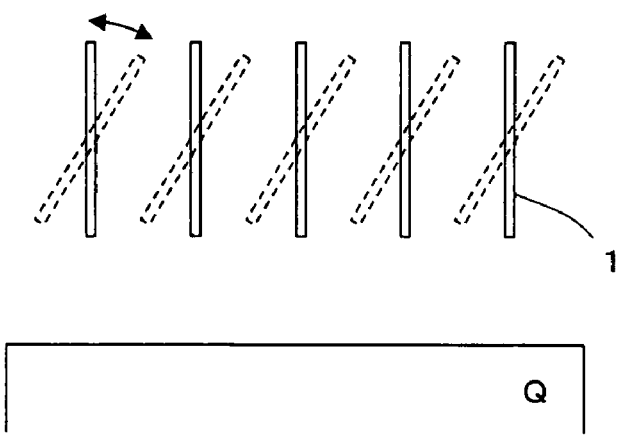
FIG. 13 is a side view showing a modified example of the light distribution control device according to the fifth embodiment of the present invention.

As shown in FIG. 13, when the light distribution control device according to Embodiment 5 includes the adjusting mechanism 2 which is described and provided in Embodiment 2 to easily adjust the angle of the respective structures 1, light can be more certainly introduced/redirected to the region Q for which light distribution is required.

Figure 14:
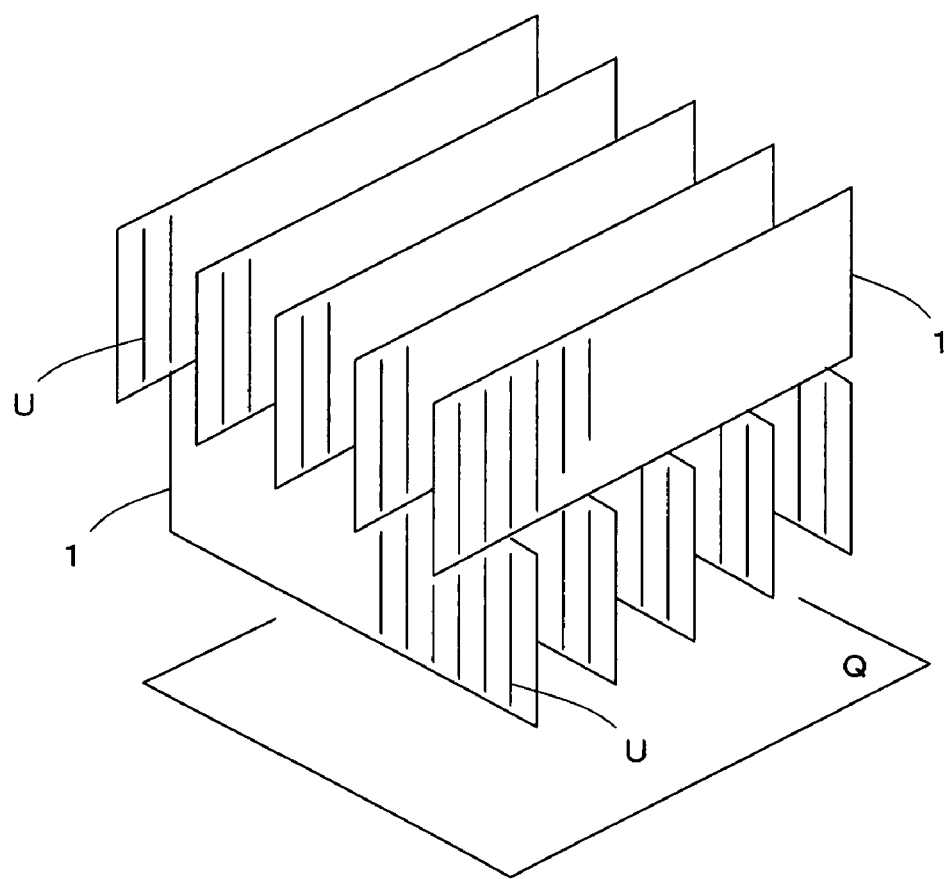
FIG. 14 is a perspective view showing another modified example of the light distribution control device according to the fifth embodiment of the present invention.

Further, as shown in FIG. 14, two arrays of the plurality of structures 1 can be vertically overlapped with each other. In this case, the direction of array of the structures 1 located on the upper side and the direction of array of the structures 1 located on the lower side are crossed with each other. For example, the directions of the arrays are preferably made orthogonal to each other. With such arrays, light can be more efficiently introduced/redirected from a light source and distributed to the region Q.

The respective structures 1 shown in FIGS. 12 and 14 are not necessarily aligned in the vertical direction and may be arrayed such that light from a light source is incident thereon at an angle relative to the horizontal direction.

The structure 1 is not limited to the structure described in Embodiment 1 and thus the structures having the cross sectional shapes, as described in Embodiments 3 and 4, may be used.

Example 1

Figure 15:
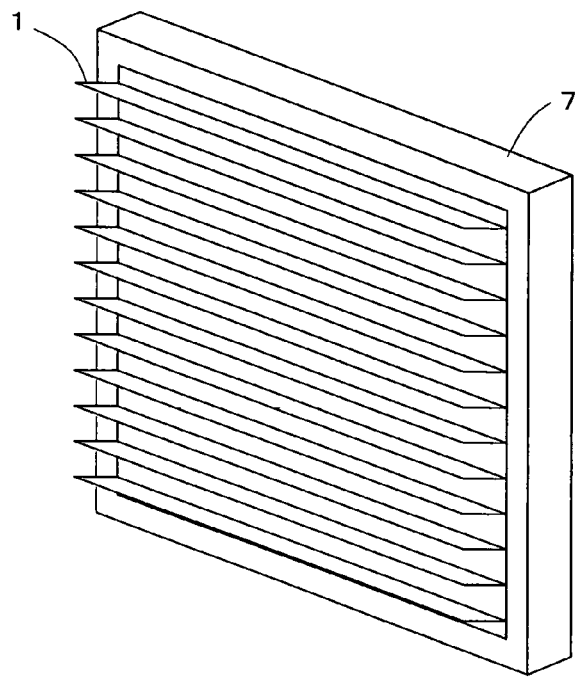
FIG. 15 is a perspective view showing a light distribution control device according to Example 1.

FIG. 15 shows a light distribution control device specifically embodied according to Example 1 of the present invention. The light distribution control device according to Embodiment 1 is installed at a window 7, through which outside light enters. The plurality of structures 1 of the light distribution control device is arrayed along the surface of the window 7. The flux of light diffused by the ridges U of each of the structures 1 is introduced into a room.

Example 2

Figure 16:
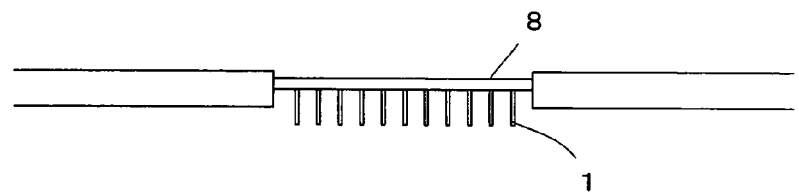
FIGS. 16 to 19 are cross sectional views showing light distribution control devices according to Examples 2 to 5, respectively.

As shown in FIG. 16, the light distribution control device according to Embodiment 1 is installed at a skylight 8, through which outside light enters. The plurality of structures 1 of the light distribution control device is arrayed along the surface of the skylight 8. The flux of light diffused by the ridges U of each of the structures 1 is introduced from above into a room.

Example 3

Figure 17:
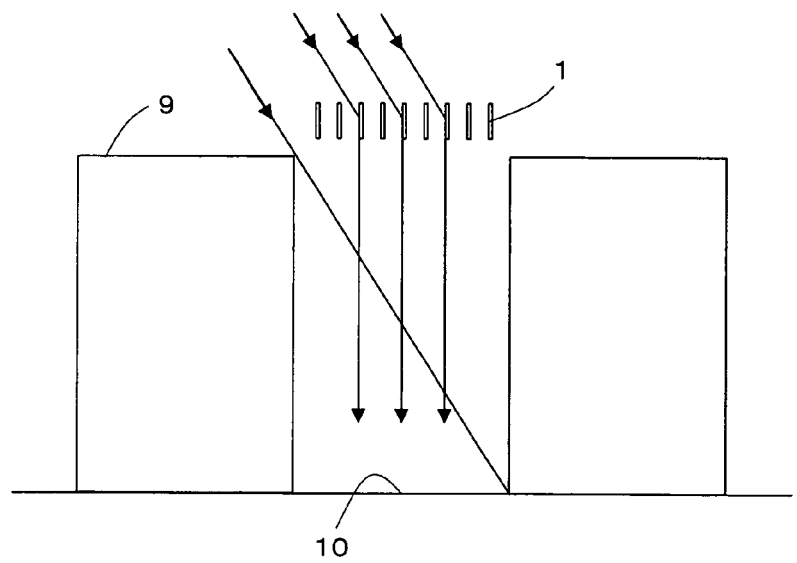

As shown in FIG. 17, the light distribution control device according to Embodiment 1 is installed at a place where outside light enters/reaches, and which is located above the region 10 shaded by the building 9. The plurality of structures 1 of the light distribution control device are arrayed above the region 10 in the horizontal direction in a state in which each thereof is aligned in a vertical direction. The flux of light diffused by the ridges U of each of the structures 1 is introduced from above to the region 10.

Example 4

Figure 18:
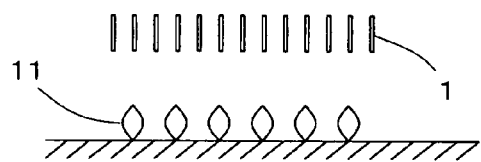

As shown in FIG. 18, the light distribution control device according to Embodiment 1 is provided above the crops 11 that are being cultivated or on a side thereof in an open-field culture. The flux of light diffused by the ridges U of each of the structures 1 is introduced from above to the crops 11 being cultivated. Therefore, the crops 11 being cultivated can be effectively irradiated with sunlight or artificial light, so that cultivation can be accelerated.

Example 5

Figure 19:
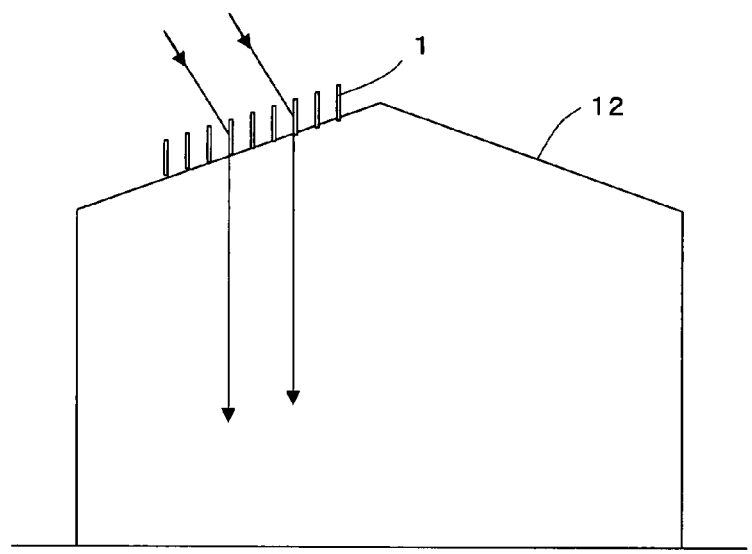

As shown in FIG. 19, the light distribution control device according to Embodiment 1 is installed on or above the roof of a greenhouse 12. The plurality of structures 1 of the light distribution control device is arrayed along the roof of the greenhouse 12 in a state where each of the structures 1 is aligned in a vertical direction. The flux of light diffused by the ridges U of each of the structures 1 is introduced from above to the interior of the greenhouse 12.

Figure 20:
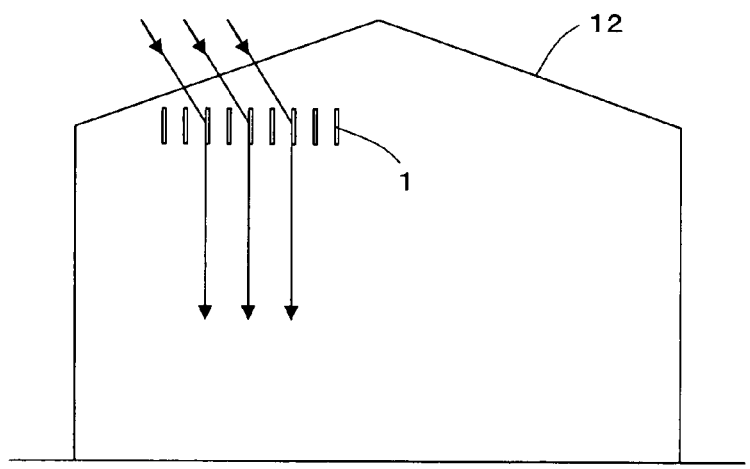
FIG. 20 is a cross sectional view showing a modified example of the light distribution control device according to Example 5.

As shown in FIG. 20, even when the light distribution control device according to Embodiment 1 is provided in an inner upper portion of the greenhouse 12, the same effect is obtained.

The light distribution control device may be located not only on the greenhouse 12 and in the inner upper portion of the green house 12 but also in the vicinity of the ceiling portion and/or the wall portion of the greenhouse 12.

Example 6

Figure 21:
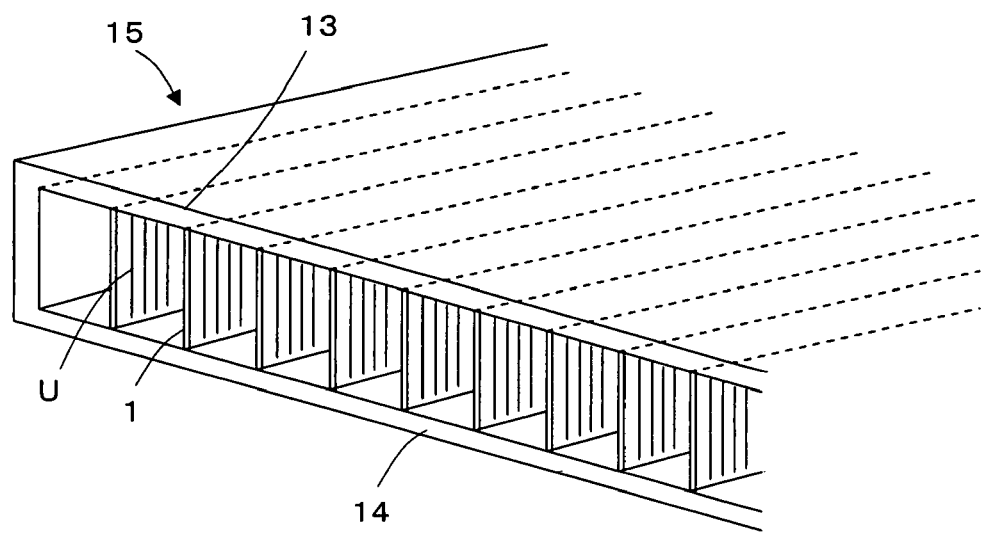
FIG. 21 is a partial perspective view showing a light distribution panel used for a greenhouse according to Example 6.
Figure 22:
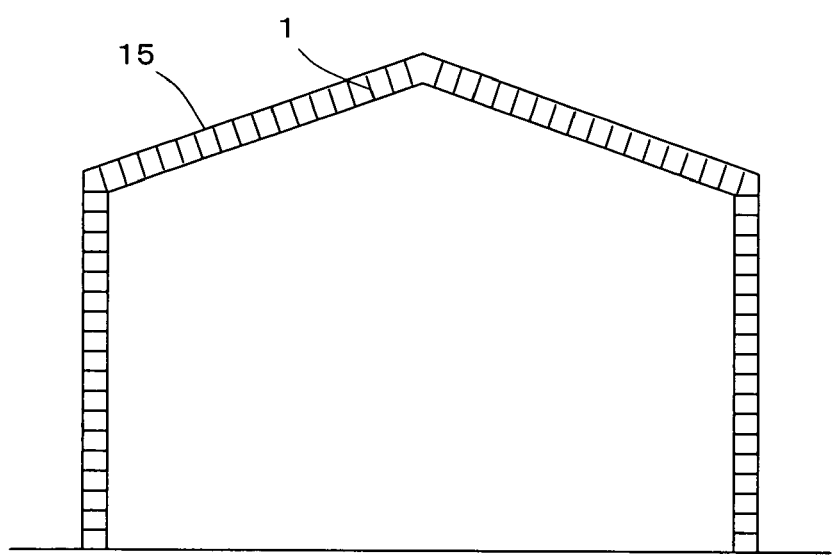
FIG. 22 is a cross sectional view showing the greenhouse according to Example 6.

As shown in FIG. 21, a light distribution panel 15 is made having two transparent plates 13 and 14, each of which is made of a resin, glass, or the like, and are arranged in parallel at a distance. The light distribution control device according to Embodiment 1 having a number of structures 1 is interposed between the transparent plates 13 and 14. Then, as shown in FIG. 22, the ceiling portion and the wall portion of a greenhouse are formed using the light distribution panel 15. Light diffused by the ridges U of each of the structures 1 in the light distribution panel 15 is introduced from above and the side to the interior of the greenhouse.

Because the light distribution control device is interposed between the transparent plates 13 and 14, a large number of structures 1 are protected from heat by a heat insulation effect.

It is not necessary to form both the ceiling portion and the wall portion of the greenhouse using the light distribution panel 15. It is also effective to form at least one of the ceiling portion and the wall portion or a part thereof using the light distribution panel 15.

In addition to Examples 1 to 6 described above, it is effective that, for example, the light distribution control device according to the present invention is provided above a photosensitive portion of a solar battery or in front thereof to perform efficient light distribution on the photosensitive portion.

According to the present invention, the improvement of symmetry of light diffusion and the efficient use of a diffused flux of light can be realized without the requirement for further improvement of a manufacturing technology close to the limit of the current technology level.

What is claimed is:

1. A light distribution control device having a plurality of structures each of which is formed in a plate-like shape or a film-like shape with at least one of optical transparency and optical reflectivity, and comprises a plurality of ridges arrayed in parallel on at least one of the surfaces of the structure, the ridges being disposed close to each other, each of the ridges having a cross section that is orthogonal to the longitudinal direction of the ridges, formed in a portion of a substantial circle, and a surface of each of the ridges being specular, resulting in incident light on the ridges being diffused in a circular conical-like surface or a half-circular conical-like surface having a center axis coinciding with a line that passes an incident point of the incident light and is parallel to the ridges.

2. A light distribution control device, comprising:

a plurality of structures, each of which is formed in a plate like shape and a film like shape with at least one of optical transparency and optical reflectivity, and includes a number of ridges which are arrayed in parallel on at least one of the surfaces of each of the structures and placed close to each other, each of the ridges having a cross section, orthogonal to the longitudinal direction of the ridges, formed in a portion of a substantial circle, and the surface being specular, the structures being arrayed such that the ridges are parallel to each other and the corresponding surfaces adjacent structures are in parallel and spaced apart from each other at a predetermined distance, wherein light diffused in one of a circular conical-like surface and a semi-circular conical-like surface having a center axis coincident with a line parallel to the ridges, the diffused light being transmitted in a direction for light distribution when light is incident on the ridges of each of the structures.

3. A light distribution control device according to claim 2, wherein the plurality of ridges are formed on both of the surfaces of each one of the plurality of structures.

4. A light distribution control device according to claim 2, wherein:

each of the plurality of structures has either a long and thin plate shape or a long and thin film shape; and each of the plurality of structures has a number of ridges that are formed along a direction crossing a longitudinal direction of the respective structure.

5. A light distribution control device according to claim 4, wherein each of the plurality of structures has a cross section, the orthogonal to the longitudinal direction thereof, which has either a bent shape or a V-shape.

6. A light distribution control device according to claim 2, further comprising an adjusting mechanism for varying an angle of each of the plurality of structures relative to the arraying direction of the plurality of structures.

7. A light distribution control device according to claim 2, wherein the light distribution control device is adapted to be installed at a window through which outside light enters, and the plurality of structures are arrayed along a surface of the window to introduce light diffused by the ridges of the plurality of structures into a room.

8. A light distribution control device according to claim 2, wherein the light distribution control device is adapted to be installed in a place which is located above a region shaded by a building and on which outside light enters/reaches to introduce light diffused by the ridges of the plurality of structures to the region which would be shaded by the building.

9. A light distribution control device according to claim 2, wherein the light distribution control device is adapted to be installed on at least one of a ceiling portion and a wall portion of a greenhouse or in a vicinity thereof to introduce light diffused by the ridges of the plurality of structures to the interior of the greenhouse.

10. A greenhouse, comprising:

a ceiling portion and a wall portion; and a light distribution control device having a plurality of structures, each of which is formed in a plate like shape and a film like shape with at least one of optical transparency and optical reflectivity, and includes a number of ridges which are arrayed in parallel on at least one of the surfaces of each of the structures and placed close to each other, each of the ridges having a cross section, orthogonal to the longitudinal direction of the ridges, formed in a portion of a substantial circle, and the surface being specular, the structures being arrayed such that the ridges are parallel to each other and the corresponding surfaces of adjacent structures are in parallel and spaced apart from each other at a predetermined distance, wherein light is diffused in one of a circular conical-like surface and a semi-circular conical-like surface having a center axis coincident with a line parallel to the ridges, the diffused light being transmitted in a direction for light distribution when light is incident on the ridges of each of the structures, wherein the light distribution control device is installed on at least one of the ceiling portion and the wall portion or in a vicinity thereof.

11. A greenhouse according to claim 10, wherein at least one of the ceiling portion and the wall portion is formed by a light distribution panel having the light distribution control device interposed between two transparent plates.

* * * * *